Jan. 24, 1956     F. E. FOWLER     2,731,936
ALARM SYSTEM FOR PNEUMATIC TIRES
Filed June 12, 1952     2 Sheets-Sheet 1
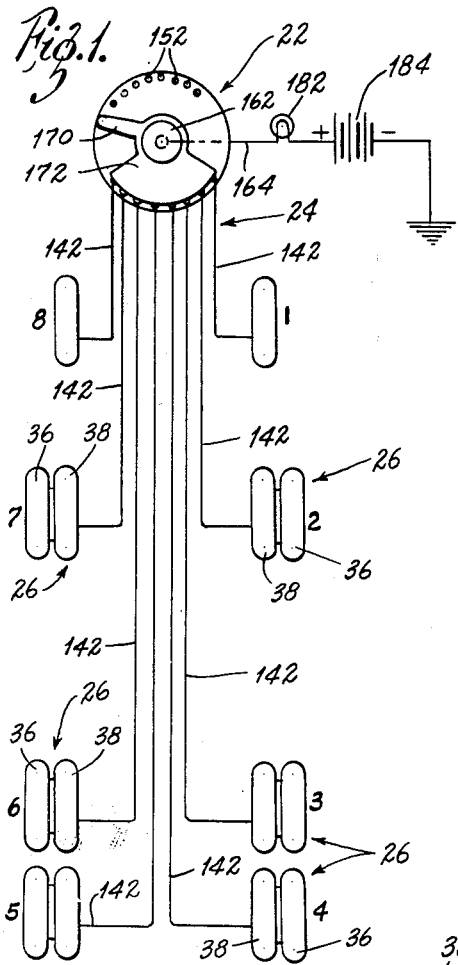
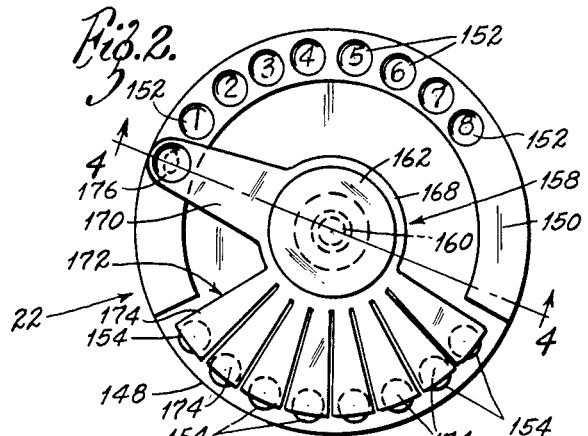
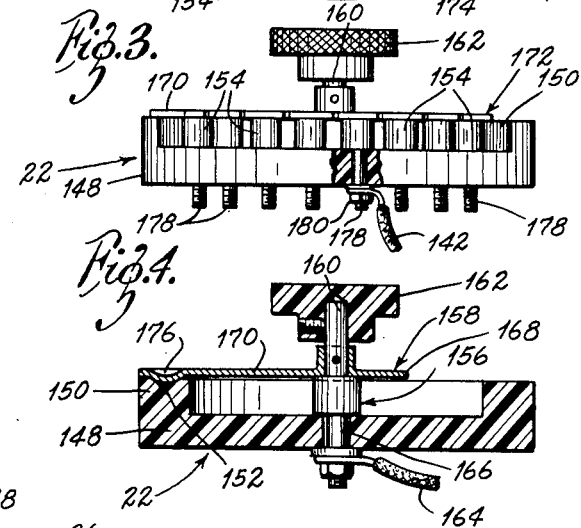
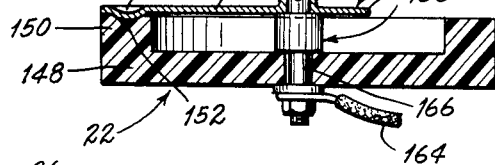
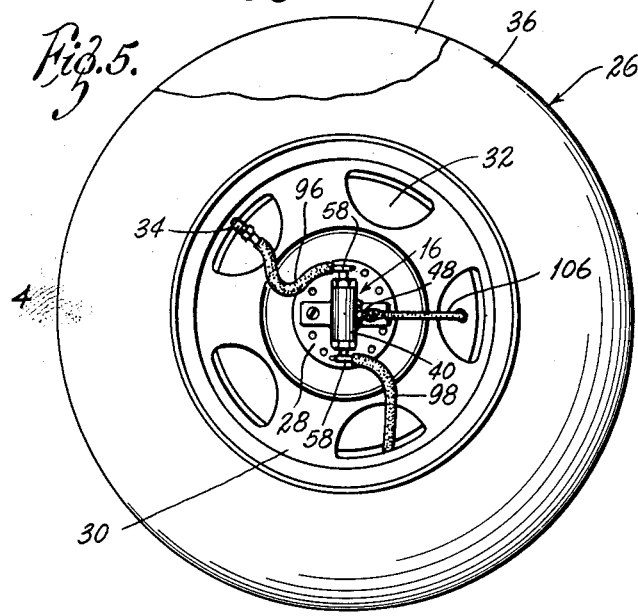
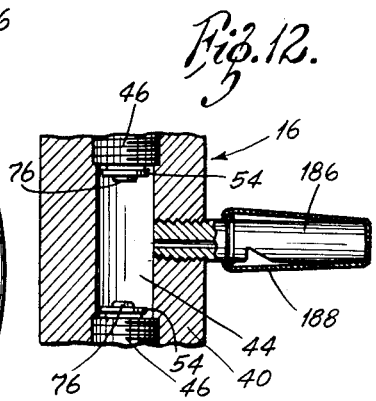
INVENTOR:
FRANK E. FOWLER,
BY Kingsland, Rogers & Ezell
ATTORNEYS Jan. 24, 1956 F. E. FOWLER 2,731,936
ALARM SYSTEM FOR PNEUMATIC TIRES
Filed June 12, 1952 2 Sheets-Sheet 2
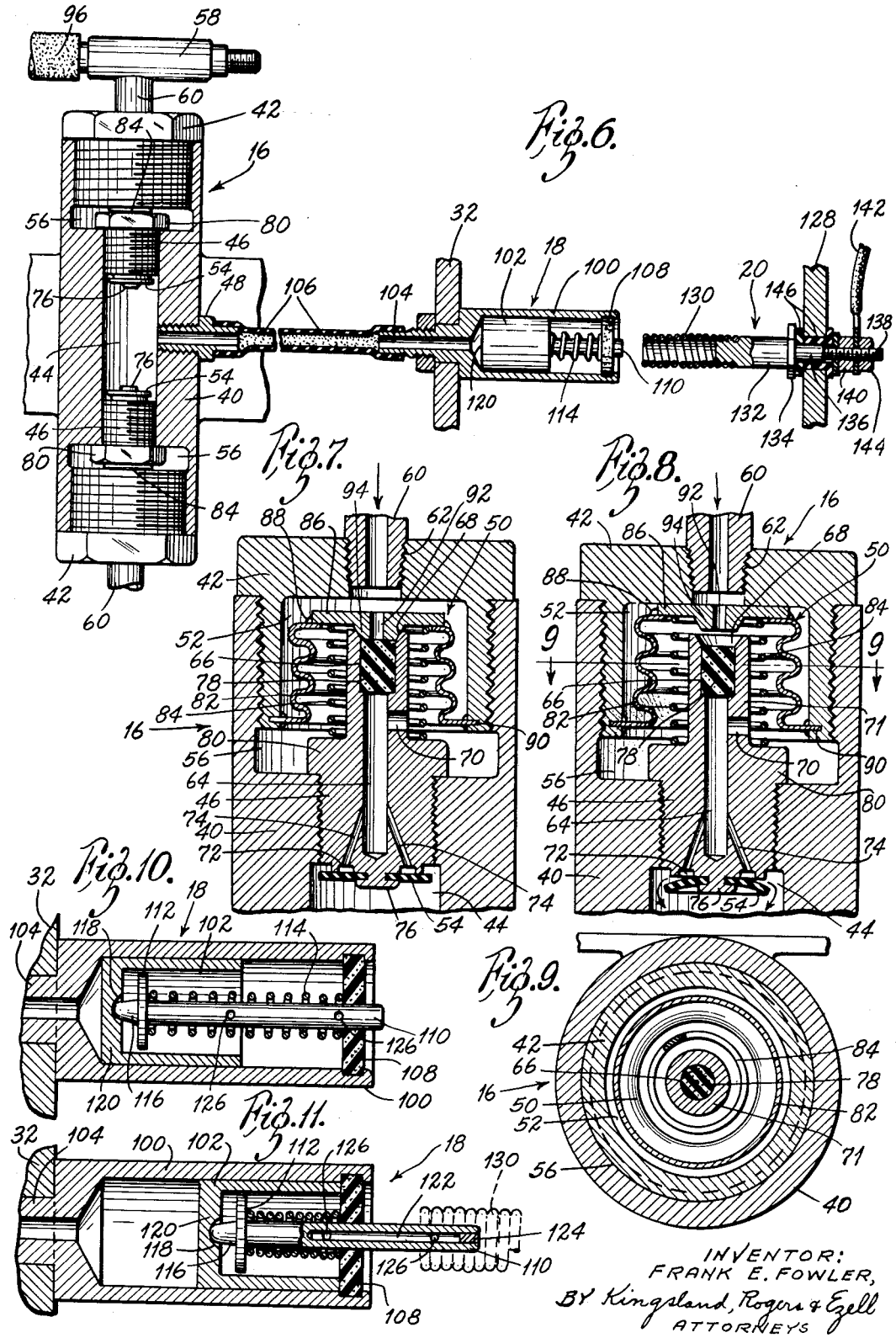
INVENTOR:
FRANK E. FOWLER,
BY Kingsland, Rogers & Ezell
ATTORNEYS

United States Patent Office 2,731,936
Patented Jan. 24, 1956

2,731,936
ALARM SYSTEM FOR PNEUMATIC TIRES
Frank Edward Fowler, Athens, Ga.

Application June 12, 1952, Serial No. 293,038

3 Claims. (Cl. 116—34)

Generally, the present invention relates to an alarm system adapted for installation on an automotive vehicle, to inform the operator that one or more of the pneumatic tires on the vehicle is losing pressure.

More particularly, the invention is directed to an alarm system of this character for installation on a heavy duty, multi-wheeled trailer truck equipped with several sets of dual tires. On vehicles of this type, the loss of air pressure by one of a set of dual tires imposes an excessive load on the other, as is understood. Consequently, if the deflation of one tire continues, it frequently happens that a blowout of the other follows, thus causing great damage to both tires.

The present invention is designed to automatically effect the functioning of a signal located in the cab of the vehicle whenever the air pressure in any of the tires drops below normal; and to provide means suitably mounted in the cab for quickly determining on which wheel the tire in question is located.

In brief, the present invention includes valve units mounted upon the wheels of a pneumatically tired truck, or the like, each of which is in pneumatic connection with the interior of a tire, and each of which is in pneumatic connection with a reciprocable member mounted for rotation with the wheel for actuation of the latter upon drop in pressure in the tire. An alarm is provided in the truck cab, or the like, which is energized by power from the truck battery upon drop in pressure in the tire. A common switch is included in the electrical circuit between the alarm and a contactible member mounted adjacent the reciprocable member for determining the tire which is in trouble before the truck is stopped.

Therefore, a primary object of this invention is to provide an alarm system for pneumatic tired vehicles which includes a signal light, a buzzer or other warning means in the vicinity of the steering wheel; means associated with each road wheel for automatically causing said warning means to function when the air pressure in a tire is escaping; and a manually operable device within reach of the operator for quickly determining on which road wheel the tire which requires attention is located.

Another object of the invention is to provide a tire pressure alarm system in the nature of a permanent installation. That is to say, the included mechanisms are so mounted on the vehicle as to be shielded from snow, ice, road splash and any other extraneous matter which would tend to impair their efficient operation.

The invention also incorporates means on each wheel for facilitating tire inflation without disturbing any parts of the system, as will appear.

A more comprehensive understanding of the invention may be had from the detailed description thereof to follow with reference to the accompanying drawings, wherein:

Fig. 1 is a schematic layout of the alarm system included in the present invention, shown applied to a tractor and trailer combination having a total of eight wheels, six of which are dual-tired;

Fig. 2 is a top plan view of a manually operable switch for visibly indicating which of said wheels of Fig. 1 requires attention;

Fig. 3 is an edge view of said indicator switch partially broken away, only one of the eight lead wires connected thereto being shown in the interest of clarity;

Fig. 4 is a vertical sectional view taken on the line 4—4 in Fig. 2;

Fig. 5 is a side elevational view of a dual-tired truck or trailer wheel on the hub cap of which the low pressure valve unit of the invention is mounted;

Fig. 6 is a view in vertical section of said valve unit, of a plunger cylinder rigidly secured to a brake drum, of a contact spring assembly mounted on the opposing brake shoe supporting plate, and of the associated fluid and electrical connections, the view being arranged to clearly demonstrate the interrelationship which obtains between the valve unit, the plunger cylinder, and the spring assembly aforesaid;

Fig. 7 is an enlarged fragmentary reproduction of the upper left hand portion of Fig. 6, elements which appear elevationally in the latter view being shown in vertical section;

Fig. 8 is a view similar to Fig. 7 portraying certain elements in an alternate moved position;

Fig. 9 is a horizontal section taken on the line 9—9 of Fig. 8;

Fig. 10 is an enlarged fragmentary reproduction of the central portion of Fig. 6, elements which appear elevationally in the latter view being shown in vertical section;

Fig. 11 is a view similar to Fig. 10 portraying certain elements in an alternate moved position; and Fig. 12 is a fragmentary sectional view illustrating a modification.

Generally, the preferred and illustrated embodiment of the invention includes a plurality of low pressure valve units 16; a corresponding number of plunger cylinders 18 and contact spring assemblies 20; a manually operable indicator switch 22; a wire leading from each contact spring assembly 20 to the indicator switch 22, said wires being designated collectively by the numeral 24 in Fig. 1; and other elements associated with the structure specified as will appear.

It is here noted that, whereas in the illustrated embodiment of the invention there are six dual-tired and two single-tired wheels, the detailed description hereinafter will proceed with reference to one of the dual-tired wheel assemblies.

Thus, in Fig. 5, numeral 26 designates a dual-tired wheel assembly which typifies any one of the similarly designated assemblies appearing in Fig. 1. A low pressure valve unit 16 is shown rigidly mounted on the hub cap 28, and also illustrated are the outer disc 30, the brake drum 32, an air valve stem 34, the outer tire casing 36, and the inner tire casing 38 of said wheel assembly.

With particular reference now to Figs. 6 through 9, the unit 16 includes a hollow casing 40 closed at the ends by plugs 42, having a longitudinal bore 44 closed at the ends by valve plugs 46; a fitting 48 leading from said bore 44; a spring biased bellows assembly 50 supported in a chamber 52 provided in each plug 42; a flap valve 54 on the inner extremity of each valve plug 46; and an internally threaded counterbore 56 at each end of the casing 40 for the reception of the plugs 42. A suitable air intake check valve device 58, which includes a tubular stem 60, is provided at each end of the unit 16, the extremities of said stems 60 engaging threaded apertures 62 provided in the plugs 42. It is noted and should be apparent that, as viewed in Fig. 6, the upper and lower half constructions of the unit 16 are identical in every respect.

Each valve plug 46 has a central longitudinal bore 64; a counterbore 66 terminating in an outwardly flared portion 68; an air inlet port 70 formed normal to the bore 64 in a reduced upwardly extending section 71 of the plug; an annular recess 72; one or more angularly disposed air outlet passageways 74 each in fluid communication at one end with the central bore 64 and at the other with said annular recess 72; and a suitably formed tip 76 for retaining the flap valve 54 in place. A cylindrical block 78, of resilient material, such as rubber or the like, is seated in the counterbore 66; and to facilitate mounting operations, the plug 46 is provided with a polygonal flange 80, as shown.

Each assembly 50 includes a bellows 82, a compression spring 84, and a disc 86, the latter soldered or welded to the top of said bellows 82, as suggested at 88. The bellows 82 is open at the bottom, with its annular lower marginal edge portion 90 anchored and sealed in the plug 42, as illustrated. The spring 84 is interposed about the reduced plug section 71 between the flange 80 and the disc 86, and the latter has a central orifice 92 therein surrounded by an inwardly tapered boss 94.

Reverting now to Fig. 5, numeral 96 designates a hose connection between one of the air check valves 58 and the standard valve stem 34 of the outer tire 36; 98 designates a similar connection between the other check valve 58 and the valve stem (not shown) of the inner tire 38.

Each assembly 18 is rigidly mounted on a brake drum 32, as illustrated in Fig. 6, and includes a hollow cylinder 100, a piston 102 reciprocable therein, and a projecting fitting 104 integral therewith. A hose connection 106 between said fitting 104 and the fitting 48 of the unit 16 establishes fluid communication between the bore 44 of said unit 16 and the cylinder 100 of the assembly 18.

As best seen in Figs. 10 and 11, each assembly 18 further includes an end closure member 108; a plunger 110 slidable therein; a collar 112 on the plunger 110; a compression spring 114 interposed about the plunger 110 between said collar 112 and the member 108; a rounded centering point 116 on the plunger 110; a semi-circular depression 118 in the head portion 120 of the piston 102; a longitudinal bore 122 drilled in the plunger 110 and subsequently plugged at 124; and a pair of spaced transverse ports 126 each intersecting the bore 122.

The assembly 20 is rigidly secured to the brake mechanism supporting plate 128 associated with each wheel. As shown in Fig. 6, the assembly 20 includes a contact spring 130, preferably of bronze; a supporting stud 132 therefor which includes a polygonal flange 134, a reduced section 136, and a further reduced threaded shank 138; a nut 140 applied to said shank 138 to maintain the stud 132 in place; a wire connection 142 leading to the indicator switch 22; and a nut 144 also applied to the shank 138 for locking the terminal 143 of said wire 142 thereon. Suitable insulation 146 is interposed between the stud 132 and plate 128, as the drawing clearly shows.

The construction of the selector switch 22 is illustrated in Figs. 2 through 4. It includes a circular plastic base 148 having an arcuate upstanding rim portion 150 integral therewith; a series of radially spaced depressions 152 in said rim portion 150; a series of radially spaced contacts 154 approximately diametrically opposite the depressions 152; a rotatable spindle 156 mounted centrally of said base 148; a contact plate 158 secured to a reduced upward extension 160 of the spindle 156; a knob 162 secured to the upper end of said extension 160; and a wire 164 attached at one end to a reduced depending extension 166 of the spindle 156.

As best seen in Fig. 2, the contact plate 158 is of ingenious design. It includes a central body portion 168; a radial arm 170, and a fan-like or sector shaped portion 172, the latter being subdivided into a series of radial blades 174 corresponding in number to that of the contacts 154. Formed in the extremity of the arm 170 is a depressed or downwardly extruded segment 176 contoured to yieldingly engage in any one of the depressions 152.

As Fig. 3 demonstrates, each of the contacts 154 includes a reduced depending shank portion 178, the lower extremity of which is threaded for the application of a nut 180, whereby the terminal of a wire 142 may be secured to said shank portion 178, only one being shown for clarity.

With attention directed to Fig. 1, the wire 164 leads to a signal lamp 182, thence to the storage battery 184 of the vehicle, the battery 184 being grounded as indicated and understood. Obviously, a buzzer may be substituted for the lamp 182 without in any manner affecting the operation of the system.

It is noted that the depressions 152 are progressively marked in accordance with the number of wheels with which the vehicle is equipped, and that there is one extra depression marked with a zero. Normally, as best shown in Fig. 4, the segment 176 engages in this extra depression, whereby each of the blades 174 is maintained in engagement with one of the contacts 154. It is further noted that for a better understanding of the operation, the wheels in the diagram of Fig. 1 are indicated by numerals placed adjacent thereto without lead lines, the numerals corresponding to those marked in the depressions 152. It is likewise noted that in the case of wheels 1 and 8, one of the threaded apertures 62 in each of the units 16 applied to these wheels would be plugged, as should be understood.

*Operation*

It will be assumed that Fig. 5 represents the wheel 4 and that the tires 36 and 38 thereon are inflated to the proper pressure, for example, eighty pounds per square inch. As long as this pressure obtains, both bellows assemblies 50 will be maintained inwardly since the air pressure entering the chambers 52 via check valves 58 and hoses 96 and 97 will overcome the force of the compression springs 84, thus seating the bosses 94 firmly against the rubber blocks 78.

As a result, all of the air under pressure in the unit 16 is confined within the two outer chambers 52, escape of air therefrom being prevented by the seal which the lower marginal portion 90 of the bellows provides, as should be clear from an inspection of Fig. 7.

Assuming now that a leak develops in the tire 36 so that the pressure therein drops to 75 pounds per square inch, for example, the latter pressure is no longer sufficient to overcome the force of the spring 84 appearing in Fig. 7. As a result, said spring 84 expands the bellows 82 to elevate its top plate 86 to the position thereof portrayed in Fig. 8, thus unseating the boss 94. Consequently, the air under diminishing pressure flows through the orifice 92 into counterbored chamber 56, thence via inlet port 70 into the bore 64 and through passageways 74 into the annular recess 72, whence the air escapes into the longitudinal bore or chamber 44 around the thus unseated flap valve 54.

It is observed with reference to Fig. 6 that, because of the opposed disposition of the flap valves 54, the air pressure in the chamber 44 at this time is exerted against the inner face of the inactive one of said flap valves to seal the annular recess 72 associated therewith.

Therefore, said air proceeds via the fitting 48, the hose 106 and fitting 104 into the cylinder 100 where it strikes against the head portion 120 of the piston 102. Consequently, said piston 102 moves inwardly against the force of the spring 114 until its leading end abuts the closure member 108, as portrayed in Fig. 11. Because the piston 102 is a floating one, being slightly smaller in diameter than the cylinder, and since the closure member 108 is of yielding material, a hermetic seal is thus established upon engagement of the former with the latter for preventing an increased loss of air pressure from a tire which is already losing pressure. This seal is particularly effective in case of a blowout, as will be explained.

As shown in Fig. 11, the inward movement of the piston 102 projects the plunger 110 into position for striking the flexible contact spring 130 during each revolution of the wheel 4, it being remembered that the assembly 20 is insulatively mounted on the stationary plate 128, whereas the assembly 18 is mounted on the brake drum 32 which revolves with the wheel and is grounded to the truck frame through the axle and other parts, as is well known.

Therefore, each time the plunger 110 strikes the spring 130, a circuit is momentarily closed, said circuit being traced from the truck frame through the assembly 18, the contact spring assembly 20, the wire 142, the fourth contact 154 from right to left of the series on the selector switch 22, the contact plate 158, the spindle 156, the lead 164, the lamp 182 (or a buzzer if desired), and the battery 184 which is grounded to the chassis.

Each time the circuit closes on contact of the plunger 110 with the spring 130, the signal 182 in the cab is actuated, so that, assuming the signal to be a light, the intermittent flashing or blinking thereof warns the operator that one of the tires is losing air. Quickly retarding the speed of the vehicle, the operator grasps the knob 162, rotates the contact plate clockwise until the blinking ceases, and then brings the vehicle to a stop.

Thereupon he observes that the segment 176 of the arm 170 is resting in the depression 152 which is marked 4. Therefore, he knows that one of the tires on the road wheel 4 requires attention. After determining which tire is losing air, the operator may temporarily restore the lost pressure by means of a hand pump via check valve 58 and proceed slowly to the next service station or take other appropriate action, as is understood.

As previously intimated, in the event of a blowout, the hermetic seal between the piston 102 and the semirigid closure 108 is important. That is to say, when a tire blows, only a momentary surge of air strikes against the piston 102 as the pressure suddenly drops, whereby to project the plunger 110 for engaging the contact spring 130. Now, with reference to Figs. 6 and 11, it should be manifest that the hermetic seal, in conjunction with the flap valves 54, serves to trap this pressure surge at least for a sufficient time to give the operator adequate warning that one of the wheels requires attention.

From the foregoing description augmented by an inspection of the drawings, it should be apparent that this invention provides an alarm system adapted to achieve its objectives. The end closure 108, being of semi-rigid material, seals the opening therein through which the plunger 110 extends, thereby preventing the entry of dust and so on into the cylinder 100. The assembly 20 is shielded from extraneous matter within the brake drum 32, as should be understood. The plugged bore 122 and transverse ports 126 provide an arrangement for effectively insuring free reciprocation of the piston and its associated plunger, since it permits free entry and exhaust at atmosphere obviating the creation of a vacuum in the cylinder 100. The plunger rod 110 is of hard stainless steel, so that the striking thereof against the free end of the flexible spring 130 does no damage to said plunger.

Manifestly, the invention may be modified in some respects if desired. An exemplary modification is illustrated in Fig. 12. In this view, a whistle 186 is shown substituted for the fitting 48. Said whistle 186 is designed to produce a shrill blast in response to slight air pressure. Repeated tests have proven that such a whistle alarm installed on a heavy duty trailer truck is audible to the operator, even when the windows are closed. Enclosing and protecting the projecting portion of said whistle is a thin rubber casing 188 adapted to burst in response to the force exerted thereagainst by the blast of said whistle. After bringing the vehicle to a halt, the operator may easily ascertain which wheel requires attention by an inspection of the units 16 mounted on the hub caps of the road wheels. That is to say, an exposed whistle 186 indicates the wheel which requires attention.

It is, therefore, to be understood that whereas the drawings illustrate and the foregoing description sets forth in detail the preferred embodiment thereof, the invention contemplates all modifications in design and any equivalents which may fall within the scope of the appended claims.

What is claimed is:

1. An alarm system for the dual pneumatic tires of a vehicle comprising an air pressure responsive valve unit secured to one wheel including a casing, a connection between the valve stem of each tire mounted on each wheel and opposite ends of said casing, each valve stem being connected to one end of said casing, a valve in each end of said casing normally closing off a central chamber from communication with said connections, said valves opening on drop of pressure in the respective tire to which it is connected, and a warning device connected into said central chamber including a whistle mounted on said casing for receiving air directly from said central chamber.

2. The alarm system of claim 1 including means for preventing opening of one valve upon opening of said other valve due to loss of pressure in the tire to which it is connected.

3. An alarm system for the pneumatic tires of an automotive vehicle, said system comprising: an air pressure responsive valve unit rigidly secured to the hub cap of each road wheel; a flexible conduit between the valve stem of a tire mounted on said wheel and said valve unit communicating the air pressure in the tire to the valve unit and normally maintaining said valve unit closed against release of air, said valve unit including means for effecting release of air therefrom when the pressure in said tire drops below normal; a signal device responsive to the action of the valve unit upon release of air therefrom for audibly warning the operator of the vehicle that said drop in pressure has taken place, said device being a whistle mounted on the valve unit aforesaid, said air pressure valve unit including a hollow casing closed at either end by a plug; a longitudinal bore in the casing closed at one end by a valve plug; a fitting leading from said bore for the transmission of air pressure to the recited whistle; an internally threaded counterbored chamber in each end of said casing for the reception of one of said first named plugs; an internal chamber in one of these plugs, said internal chamber being in fluid communication with the interior of said tire; and a bellows assembly in said chamber, said bellows assembly being responsive to the air pressure aforesaid.

References Cited in the file of this patent

UNITED STATES PATENTS

| | | |
|---|---|---|
| 1,450,769 | Crosby | Apr. 3, 1923 |
| 1,769,508 | Harned | July 1, 1930 |
| 1,878,411 | Lambert | Sept. 20, 1932 |
| 2,135,303 | Greene | Nov. 1, 1938 |
| 2,199,032 | Stoddard | Apr. 30, 1940 |
| 2,463,335 | Warnshuis, et al. | Mar. 1, 1949 |
| 2,523,594 | Sagaser et al. | Sept. 26, 1950 |
| 2,550,041 | Cozzolino et al. | Apr. 24, 1951 |
| 2,554,594 | Shea | May 29, 1951 |